United States Patent
Filas

(10) Patent No.: US 7,122,105 B1
(45) Date of Patent: Oct. 17, 2006

(54) USE OF SIDEROPHORES TO INCREASE THE CURRENT EFFICIENCY OF IRON PLATING SOLUTIONS

(75) Inventor: Robert W. Filas, Basking Ridge, NJ (US)

(73) Assignee: Enpirion, Inc., Bridgewater, NJ (US)

( * ) Notice: Subject to any disclaimer, the term of this patent is extended or adjusted under 35 U.S.C. 154(b) by 536 days.

(21) Appl. No.: 10/278,779

(22) Filed: Oct. 24, 2002

Related U.S. Application Data

(60) Provisional application No. 60/341,734, filed on Dec. 18, 2001.

(51) Int. Cl.
*C25D 21/06* (2006.01)
*C25D 5/18* (2006.01)
*C25D 3/56* (2006.01)
*C25D 3/20* (2006.01)
*C25D 1/08* (2006.01)

(52) U.S. Cl. .................. 205/98; 205/101; 205/255; 205/259; 205/270; 205/587; 205/687; 205/704

(58) Field of Classification Search .............. 205/91, 205/98, 101, 255, 259, 270, 587, 687, 704
See application file for complete search history.

(56) References Cited

U.S. PATENT DOCUMENTS

| | | | |
|---|---|---|---|
| 3,871,973 A * | 3/1975 | Topham | 205/101 |
| 4,608,136 A * | 8/1986 | Vaughan et al. | 205/574 |
| 4,626,416 A | 12/1986 | DeVoe et al. | 423/12 |
| 5,421,987 A | 6/1995 | Tzanavaras et al. | 205/133 |
| 5,472,592 A | 12/1995 | Lowery | 205/137 |
| 5,493,053 A | 2/1996 | Bergeron, Jr. | 562/623 |
| 5,670,034 A | 9/1997 | Lowery | 205/143 |
| 5,833,820 A | 11/1998 | Dubin | 204/212 |
| 5,883,762 A | 3/1999 | Calhoun et al. | 360/113 |
| 6,344,126 B1 | 2/2002 | Moore | 205/123 |

OTHER PUBLICATIONS

Spasojević et al., "Electrochemical Behavior of the FE(III) Complexes of the Cyclic Hydroxamate Siderophores Alcahgin and Desferrioxamine E"; *Inorg. Chem.*, vol. 38, pp. 449-454, (1999), no month.

Barbeau et al., "Photochemical Cycling of Iron in the Surface Ocean Mediated By Microbial Iron(III)-Binding Ligands", *Nature*, vol. 413, pp. 409-413, (2001), no month.

Kuma et al., "Photo-Reduction of Fe(III) By Dissolved Organic Substances and Existence of Fe(III) in Seawater During Spring Blooms", *Marine Chemistry*, vol. 37, pp. 15-27, (1992), no month.

Faust et al., "Photochemistry of Aqueous Iron(III)-Polycarboxylate Complexes: Roles in the Chemistry of Atmospheric and Surface Waters", *Environ. Sci. Technol.*, vol. 27, pp. 2517-2522, (1993), no month.

Telford et al., "Siderophores", *Comprehensive Supramolecular Chemistry*, vol. 1, pp. 245-265, (1996), no month.

Albrecht-Gary et al., "Coordination Chemistry of Siderophores: Thermodynamics and Kinetics of Iron Chelation and Release", *Metal Ions in Biological Systems*, vol. 35, pp. 239-327, (1998), no month.

Kunkely et al., "Photoreduction of Aqueous Ferrioxamine B By Oxalate Induced By Outer-Sphere Charge Transfer Excitation", *Inorganic Chemistry Communications*, vol. 4, pp. 215-217, (2001), no month.

* cited by examiner

*Primary Examiner*—Edna Wong
(74) *Attorney, Agent, or Firm*—Morgan, Lewis & Bockius LLP

(57) ABSTRACT

A method of electroplating iron or an iron alloy with a solution containing an iron-chelating agent to catalytically cycle the undesirable Fe(III) species back to Fe(II) for electroplating. The iron-chelating agents may be siderophores, specifically, for example, desferrioxamine E, desferrioxamine B, alcaligin, bisucaberin, putrebactin, rhodotorulic acid, enterobactin, vibriobactin, azotochelin, myxochelin, fluvibactin, and serratiochelin.

19 Claims, No Drawings

USE OF SIDEROPHORES TO INCREASE THE CURRENT EFFICIENCY OF IRON PLATING SOLUTIONS

This application claims priority under 35 U.S.C. § 119 to U.S. Provisional Patent Application No. 60/341,734 filed on Dec. 18, 2001, the disclosure of which is hereby incorporated by reference in its entirety.

BACKGROUND OF THE INVENTION

1. Field of the Invention

This invention relates to methods of electroplating or electrodepositing a metal, particularly iron and iron alloys, onto a target substrate where the electroplating solution includes an iron-chelating agent, which forms an iron(III) complex with a higher stability constant than a corresponding iron(II) complex. The iron(III)-chelating agent complex undergoes an electrochemical reduction to produce an iron (II)-chelating agent complex, which then reacts with iron (III) to produce an iron(III)-chelating agent complex and an iron(II) species, which may then be electroplated onto the target substrate. This catalytic cycle works particularly well with siderophores as the iron-chelating agent, specifically the siderophore desferrioxamine B.

2. Discussion of the Related Art

Electroless and electroplating processes are used to form a wide variety of coatings on various types of substrates. Of particular interest, is the formation of "soft" magnetic alloys on micro-magnetic devices such as magnetic recording heads and thin-film inductors and transformers. Using photolithographic photoresist techniques, desired patterns and shapes may be electroplated onto a target substrate.

An electroplating solution may include a source of metal cations for plating, such as an easily dissociated salt of the metal or metals to be plated, for example, the sulfate or the cyanide, and a buffer to maintain the desired solution pH. A complexing agent to lower the concentration of the free metal ion, and thus slow the plating process may also be present in a typical electroplating solution. Retarding the plating process prevents a rough or brittle metal plating from forming on the plated substrate.

Electroplating may be utilized to plate films composed of complex alloys, such as CoFeX, NiFeX, and CoNiFeX alloys, where X includes such elements as P, B, S, or Mo. Typically, the X elements are added to the electroplating solution in the form of oxo-acids or salts thereof. See, for instance, U.S. Pat. No. 5,883,762.

For iron electroplating solutions, formation of ferric or Fe(III)-containing compounds is undesirable since they reduce the plating and current efficiency of the iron electroplating process. The reduction in current efficiency due to the build-up of Fe(III)-containing compounds severely decreases the time that a particular iron electroplating solution may be utilized to electroplate or electrodeposit material onto a target surface. Ferric ions also often precipitate out of the electroplating solution. The desired iron species for plating is ferrous or Fe(II), which is unstable in the presence of, dissolved dioxygen ($O_2$) and may be oxidized to ferric ions at the anode.

Clearly, there is a need for electroplating methods, which decrease the formation of ferric (Fe(III)) species, preferably to ppm levels or lower, and concurrently increase the concentration of ferrous (Fe(II)) species available for plating in an electrodeposition solution.

SUMMARY OF THE INVENTION

The present invention meets the above-stated needs and overcomes the drawbacks of current electroplating processes by the addition of an iron-chelating agent to an iron or iron alloy electrodeposition solution. The iron-chelating agent chelates iron(III) species to form a first iron(III)-chelating agent complex, which may then be electrochemically reduced to produce a first iron(II)-chelating agent complex. The first iron(II)-chelating agent complex reacts with an iron(III) species to form a second iron(III)-chelating agent complex and an iron(II) species, which may then be available for electroplating iron onto a target substrate.

The inventive method provides a catalytic process for cycling of the undesired Fe(III) back to Fe(II) for electroplating through the use of iron-chelating agents, particularly siderophores. The lower stability constant for the Fe(II)-siderophore complex makes siderophores ideal catalyst candidates for Fe(III) reduction at the cathode of the electroplating cell.

Another embodiment of the present invention may also include a method of decreasing the iron(III) species concentration in an iron electroplating solution by adding an iron-chelating agent to the iron electroplating solution. Possible iron-chelating agents may function through at least one iron-chelating functional group, such as, hydroxamate and catecholate functional groups. The iron-chelating agents may comprise siderophores, specifically, the siderophore may comprise, for example, desferrioxamine E, desferrioxamine B, alcaligin, bisucaberin, putrebactin, rhodotorulic acid, enterobactin, vibriobactin, azotochelin, myxochelin, fluvibactin, and serratiochelin.

The present inventive process may also relate to a method of electroplating iron or an iron alloy onto a substrate in an electroplating cell comprising the steps of contacting a substrate with an electroplating solution; applying a voltage across an anode and a cathode in contact with the electroplating solution in the electroplating cell; and depositing iron metal or an iron alloy onto the substrate. The iron electroplating solution may comprise iron, with both the iron(II) species and iron(III) species present, and an iron-chelating agent, which forms an iron(III)-chelating agent complex with a higher stability constant than a corresponding iron(II)-chelating agent complex.

Additional features, advantages, and embodiments of the invention may be set forth or apparent from consideration of the following detailed description and claims. Moreover, it is to be understood that both the foregoing summary of the invention and the following detailed description are exemplary and intended to provide further explanation without limiting the scope of the invention as claimed.

DETAILED DESCRIPTION OF THE INVENTION

The present invention is directed to a catalytic method of increasing the lifetime of an iron or iron alloy electroplating solution by decreasing the iron(III) species concentration in the iron or iron alloy electroplating solution. An iron-chelating agent may be added to the iron electroplating solution, which then contacts with iron(III) species to form a first iron(III)-chelating agent complex. The first iron(III)-chelating agent complex is then electrochemically reduced to produce a first iron(II)-chelating agent complex. The first iron(II)-chelating agent complex is then contacted with an iron(III) species to form a second iron(III)-chelating agent complex and an iron(II) species, which may then be electroplated onto a target substrate.

Without being limited by theory, the following catalytic process is proposed for the catalytic recycling of iron(III) back to iron(II):

a) Fe(III)+siderophore→Fe(III)–siderophore b) Fe(III)–siderophore+e$^-$→Fe(II)–siderophore c) Fe(II)–siderophore+Fe(III)→Fe(II)+Fe(III)–siderophore The Fe(II)-siderophore complexes have considerably lower stability constants than the corresponding Fe(III)-siderophore. The Fe(II)-siderophore complexes also tend to be kinetically labile with respect to Fe(II) dissociation. The result is the above-described catalytic reduction of Fe(III) at the cathode.

The electrochemical behaviors of Fe(III) complexes of two siderophores, alcaligin and desferrioxamine E, were studied by cyclic voltammetry by Spasojevic, et al. in *Inorg. Chem.*, Vol. 38, pp. 449–454 (1999). The siderophores were studied for their role in the use of iron in microorganisms. Their basic role in microorganism metabolism involves a three step process: solubilization of Fe(III) usually from insoluble ferric hydroxides; transport across the cell membrane; and deposition of Fe(III) at the required site within the cell. Often the Fe(III) is reduced to Fe(II) within the cell and is then involved in various metabolic processes.

Synthetic routes for the preparation of siderophores, especially desferrioxamine B, and analogs have been reported by Bergeron et al. in several U.S. patents, including U.S. Pat. Nos. 5,493,053; 5,322,961; 5,254,724; and 4,987,253. Desferal® is a pharmaceutical version of desferrioxamine B produced by Novartis for the treatment of acute iron intoxication and other conditions.

The present method may also utilize an iron-chelating agent, which has at least one iron-chelating functional group selected from hydroxamate and catecholate functional groups. Preferably the iron-chelating agent comprises a siderophore, such as one selected from, for example, desferrioxamine E, desferrioxamine B, alcaligin, bisucaberin, putrebactin, rhodotorulic acid, enterobactin, vibriobactin, azotochelin, myxochelin, fluvibactin, and serratiochelin. Particularly preferred is the siderophore, desferrioxamine B.

The iron-chelating agent may also be selected from the group consisting of, for instance, a linear trihydroxamic acid, a linear dihydroxamic acid, a cyclic trihydroxamic acid, a cyclic dihydroxamic acid, and a monohydroxamic acid.

The catalytic cycle of the present method further involves a step of electrochemically reducing a second iron(III)-chelating agent complex to produce a second iron(II)-chelating agent complex; and then contacting the second iron(II)-chelating agent complex with an iron(III) species to form a third iron(III)-chelating agent complex and an iron(II) species, which is then used in the step of depositing iron metal onto a target substrate.

The present method of electroplating iron onto a substrate may be conducted in a standard electroplating cell with an anode and a cathode immersed in the electroplating solution with the target substrate also positioned in the electroplating cell. To further limit the concentration of the ferric species, the solution should be degassed of oxygen by any conventional means. A soluble iron anode may be used in place of an insoluble anode to further minimize Fe(II) oxidation. Known systems for electroplating semiconductor-based substrates are described in U.S. Pat. Nos. 6,344,126; 5,833,820; 5,670,034; 5,472,592; and 5,421,987, for instance. The electroplating solution may comprise iron, present as both iron(II) species and iron(III) species, and an iron-chelating agent. The iron-chelating agent may form a first iron(III)-chelating agent complex with a higher stability constant than a corresponding iron(II)-chelating agent complex.

The iron-chelating agent may comprise at least one iron-chelating functional group, such as, hydroxamate or catecholate functional groups. The iron-chelating agent may comprise a siderophore, such as, for example, desferrioxamine E, desferrioxamine B, alcaligin, bisucaberin, putrebactin, rhodotorulic acid, enterobactin, vibriobactin, azotochelin, myxochelin, fluvibactin, and serratiochelin. Particularly preferred is the siderophore, desferrioxamine B.

Due to the catalytic nature of the iron-siderophore process, only a small amount of the iron-chelating agent may be utilized in the present method. Siderophore concentrations in the range of about $10^{-3}$ M or lower may be employed in the present method, preferably concentrations in the range of about $10^{-4}$ M to about $10^{-5}$ M are used. Such concentrations may make the present method more economically attractive.

Particularly preferred iron-chelating agents are those with higher denticity and higher binding constants with ferric ions, which would require a lower concentration of iron-chelating agent to achieve the same ratio of bound to unbound Fe(III). As demonstrated in Albrecht-Gray et al.'s chapter on "Coordination Chemistry of Siderophores: Thermodynamics and Kinetics of Iron Chelation and Release" in Vol. 35 of "Metal Ions in Biological Systems", Eds. A. Sigel and H. Sigel, pp. 239–327, Marcel Dekker, (1998), the bidentate acetohydroxamic acid would require a $10^{18}$ higher concentration than the hexadentate deferriferrioxamine B to achieve the same ratio of complexed Fe(III) to free Fe(III).

The present method may be conducted in an electroplating solution with a pH of less than about 7, preferably the pH is less than about 5, more preferred is an electroplating solution with a pH of between about 3.5 and about 2.7. Especially preferred is to conduct the process in an electroplating solution having a pH of between about 3.1 and about 2.9.

Optionally, the electroplating solution may contain a component, which indicates the concentration of iron(III) and/or iron(II) present in the solution, preferably by a spectrophotometric method. The concentration of the iron-chelating agent may then be controlled in response to the concentration measured by the spectrophotometric method. Examples of such components may include those, which undergo a spectrophotometrically measurable change when the iron converts between the ferrous and the ferric states.

The electroplating solution may also include various components to facilitate the plating process and produce a desirable coating on the target substrate, such as, stress reducing agents, complexing agents, supporting electrolytes, brighteners, buffers and so forth. Such additional electroplating solution components would be known to one of skill in the art.

The target substrate may be composed of any suitable electroplating or electrodeposition coating material, such as, for instance, metallic, plastic, or semiconductor. The target substrate may be of any form, shape, or size and may be subjected to a coating pretreatment. The present inventive method is not limited in application to any specific substrate material or substrate condition.

EXAMPLE 1

The head for a magnetic recording device is electroplated in the following manner: A standard electroplating cell with a soluble iron anode is used. The electroplating solution contains iron sulfate (as a source of iron ions), about $10^{-4}$ M desferrioxamine B, cobalt sulfate, sodium hypophosphite, a buffer, and water at a solution iron concentration of about 1 M. The pH of the electroplating solution is preferably controlled to about 3.

A current density of about $-5$ mA/cm$^2$ is applied across the cathode and anode.

COMPARATIVE EXAMPLE 2

The head for a magnetic recording device is electroplated similarly to Example 1 but without desferrioxamine B in the electroplating solution.

A current density of about $-5$ mA/cm$^2$ is applied across the cathode and anode.

The current efficiency as measured by mass for Example 1 will not deteriorate as rapidly and will be more long-lived than Comparative Example 2.

Although the foregoing description is directed to the preferred embodiments of the invention, it is noted that other variations and modifications will be apparent to those skilled in the art, and may be made without departing from the spirit or scope of the invention. The disclosures of all patents referenced herein are hereby incorporated by reference in their entireties for all purposes.

The invention claimed is:

1. A method of decreasing the iron(III) species concentration in an iron metal or iron alloy electroplating solution comprising:
    adding a siderophore to the electroplating solution;
    contacting the siderophore with an iron(III) species to form a first iron(III)-siderophore complex;
    electrochemically reducing the first iron(III)-siderophore complex to produce a first iron(II)-siderophore complex; and
    contacting the first iron(II)-siderophore complex with an iron(III) species to form a second iron(III)-siderophore complex and an iron(II) species.

2. The method according to claim 1, wherein the siderophore is present in a catalytically effective amount.

3. The method according to claim 2, wherein the catalytically effective amount of the siderophore is less than about $10^{-3}$ M.

4. The method according to claim 3, wherein the catalytically effective amount of the siderophore is between about $10^{-4}$ M to about $10^{-5}$ M.

5. The method according to claim 1, wherein the siderophore comprises at least one functional group selected from hydroxamate and catecholate.

6. The method according to claim 5, wherein the hydroxamate is selected from the group consisting of a linear trihydroxamic acid, a linear dihydroxamic acid, a cyclic trihydroxamic acid, a cyclic dihydroxamic acid and a monohydroxamic acid.

7. The method according to claim 1, wherein the siderophore is selected from the group consisting of desferrioxamine E, desferrioxamine B, alcaligin, bisucaberin, putrebactin, rhodotorulic acid, enterobactin, vibriobactin, azotochelin, myxochelin, fluvibactin, serratiochelin and mixtures thereof.

8. The method according to claim 7, wherein the siderophore is desferrioxamine B.

9. The method according to claim 1, wherein the electroplating solution is at a pH of less than about 5.

10. The method according to claim 9, wherein the electroplating solution is at a pH of less than about 3.5.

11. The method according to claim 10, wherein the electroplating solution is at a pH of less than about 3.1.

12. The method according to claim 1, wherein the electroplating solution further comprises at least one of the group consisting of a stress reducing agent, a complexing agent, a supporting electrolyte, a brightener and a buffer.

13. The method according to claim 1, further comprising:
    electrochemically reducing the second iron(III)-siderophore complex to produce a second iron(II)-siderophore complex; and
    contacting the second iron(II)-siderophore complex with an iron(III) species to form a third iron(III)-siderophore complex and an iron(II) species.

14. A method of electroplating iron metal or an iron alloy onto a substrate in an electroplating cell comprising:
    contacting a substrate with an electroplating solution, wherein the electroplating solution comprises
        iron present as iron(II) species and iron(III) species, and
        a siderophore;
    applying a voltage across an anode and a cathode in contact with the electroplating solution in the electroplating cell; and
    depositing the resulting iron metal or the iron alloy onto the substrate, wherein the siderophore comprises at least one functional group selected from hydroxamate and catecholate and forms an iron(III) siderophore complex with a higher stability constant than a corresponding iron(II) siderophore complex.

15. The method according to claim 14, wherein the hydroxamate is selected from the group consisting of a linear trihydroxamic acid, a linear dihydroxamic acid, a cyclic trihydroxamic acid, a cyclic dihydroxamic acid and a monohydroxamic acid.

16. The method according to claim 14, wherein the siderophore is selected from the group consisting of desferrioxamine E, desferrioxamine B, alcaligin, bisucaberin, putrebactin, rhodotorulic acid, enterobactin, vibriobactin, azotochelin, myxochelin, fluvibactin, serratiochelin and mixtures thereof.

17. The method according to claim 16, wherein the siderophore is desferrioxamine B.

18. The method according to claim 14, further comprising:
    electrochemically reducing the iron(III)-siderophore complex to produce an iron(II)-siderophore complex; and
    contacting the iron(II)-siderophore complex with an iron(III) species to form a second iron(III)-siderophore complex and an iron(II) species.

19. The method according to claim 18, further comprising:
    electrochemically reducing the second iron(III)-siderophore complex to produce a second iron(II)-siderophore complex; and
    contacting the second iron(II)-siderophore complex with an iron(III) species to form a third iron(III)-siderophore complex and an iron(II) species.

* * * * *